US005626398A

United States Patent [19]

Wooldridge

[11] Patent Number: 5,626,398

[45] Date of Patent: May 6, 1997

[54] SAFETY STRAP FOR A WHEELCHAIR

[76] Inventor: Brenda G. Wooldridge, HC 60, Box 299, Graham, Tex. 76450

[21] Appl. No.: 583,594

[22] Filed: Jan. 5, 1996

[51] Int. Cl.[6] .................... B60R 22/12

[52] U.S. Cl. .................... 297/488; 297/485

[58] Field of Search .................... 297/256.15, 482, 297/487, 488, 485; 119/770, 907; 128/846, 875, 876

[56] References Cited

U.S. PATENT DOCUMENTS

| | | | |
|---|---|---|---|
| 2,353,316 | 7/1944 | Muller | 397/487 |
| 3,957,282 | 5/1976 | Finnigan | 297/482 |
| 4,561,676 | 12/1985 | Tubiano | 280/801 |
| 4,618,186 | 10/1986 | Swanson | 297/468 |
| 4,834,460 | 5/1989 | Herwig | 297/485 |
| 4,846,527 | 7/1989 | Julien et al. | 297/411 |
| 5,335,957 | 8/1994 | Golder | 297/482 |

FOREIGN PATENT DOCUMENTS

| | | | |
|---|---|---|---|
| 3434010 | 6/1986 | Germany | 297/482 |
| 3501747 | 9/1986 | Germany | 297/482 |

*Primary Examiner*—Peter R. Brown

*Attorney, Agent, or Firm*—Patent & Trademark Svcs.; Joseph H. McGlynn

[57] ABSTRACT

A band of material that is formed into a pouch. Inside the pouch is a roll of foam tubing to serve as protective padding. Attached to each end of the pouch is a strap that will wrap around the vertical portion of a chair arm and will fasten to itself in order to secure a person in the chair.

4 Claims, 1 Drawing Sheet

SAFETY STRAP FOR A WHEELCHAIR

BACKGROUND OF THE INVENTION

This invention relates, in general, to a safety device for a wheelchair, and, in particular, to a strap which will attach to a wheelchair to restrain a patient.

DESCRIPTION OF THE PRIOR ART

In the prior art various types of chair straps have been proposed. For example, U.S. Pat. No. 4,561,676 discloses a child safety belt made of elastic material with a detachable securing buckle for securing one end of the strap to a chair. U.S. Pat. No. 4,618,186 discloses a child restraint comprising an adjustable waistband secured around the waist of the child and secured with VELCRO U.S. Pat. No. 4,834,460 discloses an infant/child chair restraint comprising a pair of straps, one of which encircles the waist of the child and the other passes between the child's legs. U.S. Pat. No. 4,846,527 discloses a chest supporting device for holding a patient upright in a wheelchair.

State regulations for nursing homes are increasingly aware of the feelings and sensibilities of nursing home residents. They are recommending more and more that residents be restraint free as much as possible in order to allow each resident to retain their dignity and freedom. However, along with these goals nursing homes must also consider the safety of the residents. While many residents of nursing homes can be mobile without the aid of a wheelchair, it is sometimes necessary for a nurse or attendant to be present to assist them in getting out of the wheelchair. Other residents are unable to get out of a chair and walk by themselves. Still others can get out of a chair but need help after they are out of the chair. Another problem is some residents have reduced mental facilities and forget they should not attempt to get out of a chair by themselves.

The present invention is designed to overcome all of the above problems. It will help restrain residents who should not attempt to get out of chairs by themselves and will serve as a reminder to others that they need help.

SUMMARY OF THE INVENTION

The present invention consists of a band of material that is formed into a pouch. Inside the pouch is a roll of foam tubing to serve as protective padding. Attached to each end of the pouch is a strap that will wrap around the vertical portion of a chair arm and will fasten to itself in order to secure a person in the chair.

It is an object of the present invention to provide a new and improved safety strap for a wheelchair.

These and other objects and advantages of the present invention will be fully apparent from the following description, when taken in connection with the annexed drawings.

DESCRIPTION OF THE PREFERRED EMBODIMENT

Figure 1:
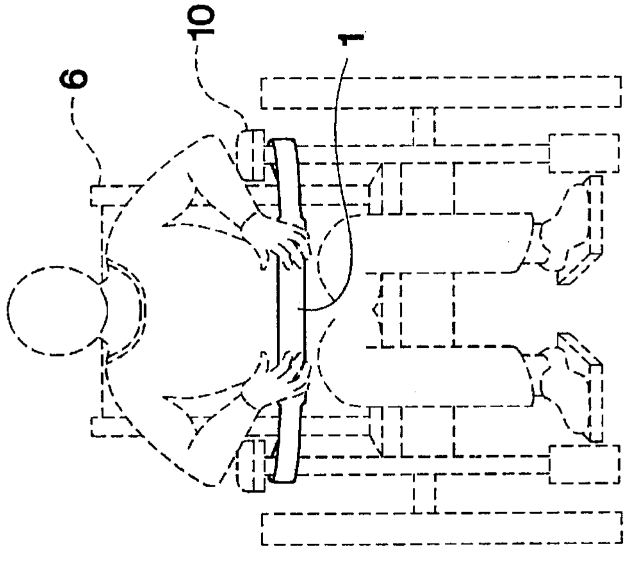
FIG. 1 is of the present invention secured to a wheelchair.

Referring now to the drawings in greater detail, FIG. 1 shows the strap 1 of the present invention attached to a wheel chair 6 having arms 10 to help restrain a person in the chair. It should be noted that although the invention is described as for use with a wheel chair, the invention could be used with any type of chair that has a portion the strap may be attached to.

Figure 2:
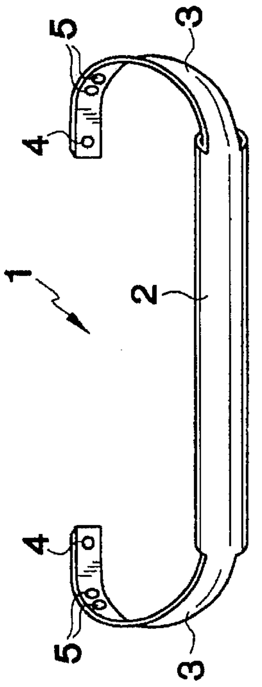
FIG. 2 is a perspective view of the present invention.
Figure 3:
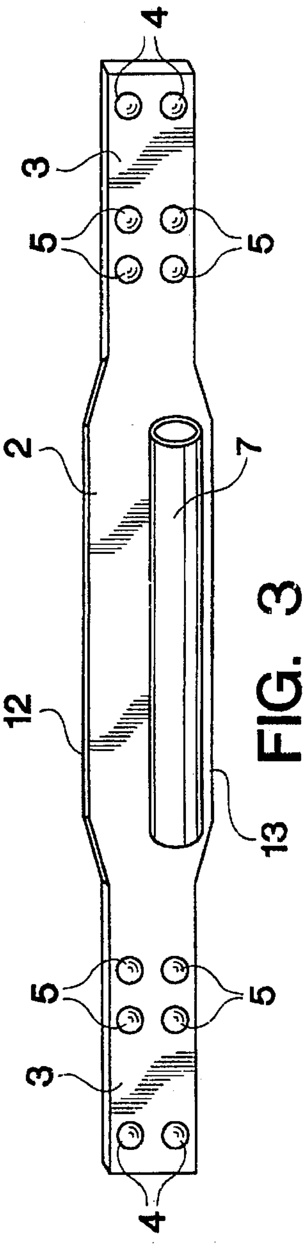
FIG. 3 is a plan view of the present invention.

FIG. 2 shows the safety strap 1 of the present invention. It consists of a center section 2 which is formed into a pouch by taking the top and bottom edges 12 and 13 (as seen in FIG. 3) and joining them to each other. This can be accomplished by any conventional means such as, but not limited to, sewing the edges together.

Inside the center section 2 is placed a roll of soft material 7, such as foam tubing, to act as protective padding to protect the person in the chair from injuring themselves. The open ends of the pouch may be closed after the roll of soft material is placed inside. Again this could be accomplished by any conventional means such as, but not limited to, sewing.

Attached to each end of the center section 2 is a end section 3. The end sections could be formed unitary with the center section, as shown in FIG. 3, or could be separate pieces that are attached after the roll of soft material is in place. Each of the end sections will have fasteners that will allow the end sections to be attached to portions of the chair. In FIG. 2, snaps 4 are shown which will be attached to snap fasteners 5. There are two snap fasteners 5 to allow the end pieces to be attached to different sizes of chair parts. Other types of fasteners could be used without departing from the scope of the invention. For example VELCRO could also be used.

Figure 4:
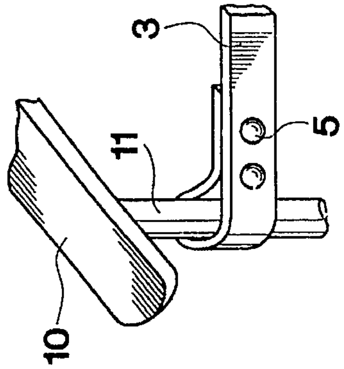
FIG. 4 is a partial view showing the strap wrapped around part of the chair arm.

In order to use the safety strap all that is necessary is to attach one end section around a vertical portion 11 of the chair arm 10, as shown in FIG. 4. The end piece will wrap around the arm and will be fastened to itself. The center section will then be extended and placed across the waist of the person in the chair and then the other end section will be attached to the other arm of the chair.

Although the wheel chair strap and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A safety strap to assist in restraining a person in a chair comprising:

a center section having a top edge and a bottom edge,
means for joining said edges together to form a pouch,
a tubular piece of soft material inside said pouch,
a pair of end sections secured to said center section,
each said end section having means for attaching a first portion of each said end section to a second portion of said end sections for forming a loop which is adapted to be secured to a chair,
whereby when said end sections are secured to portions of a chair a person in the chair will be restrained in the chair.

2. The safety strap as claimed in claim 1, wherein said soft material is foam tubing.

3. The safety strap as claimed in claim 1, wherein said means for attaching a first portion of each said end section to a second portion of said end sections is snaps.

4. The safety strap as claimed in claim 1, wherein said end sections are adapted to be secured to portions of arms on said chair.

* * * * *